Figure 3:
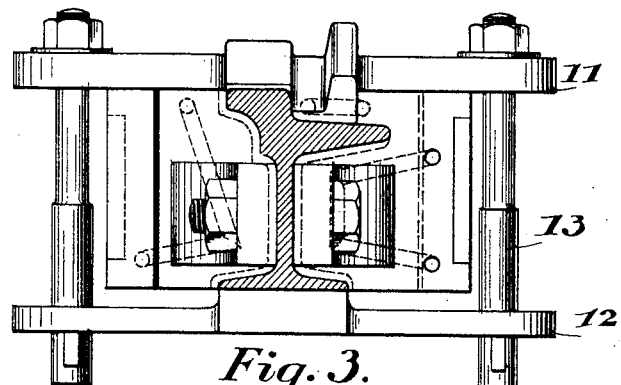

(No Model.) 3 Sheets—Sheet 1.
R. EYRE.
TRACK WELDING.
No. 602,284. Patented Apr. 12, 1898.
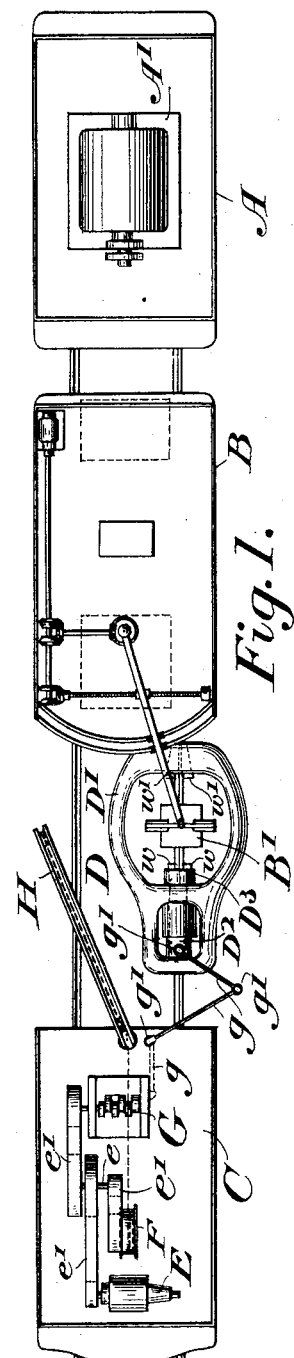
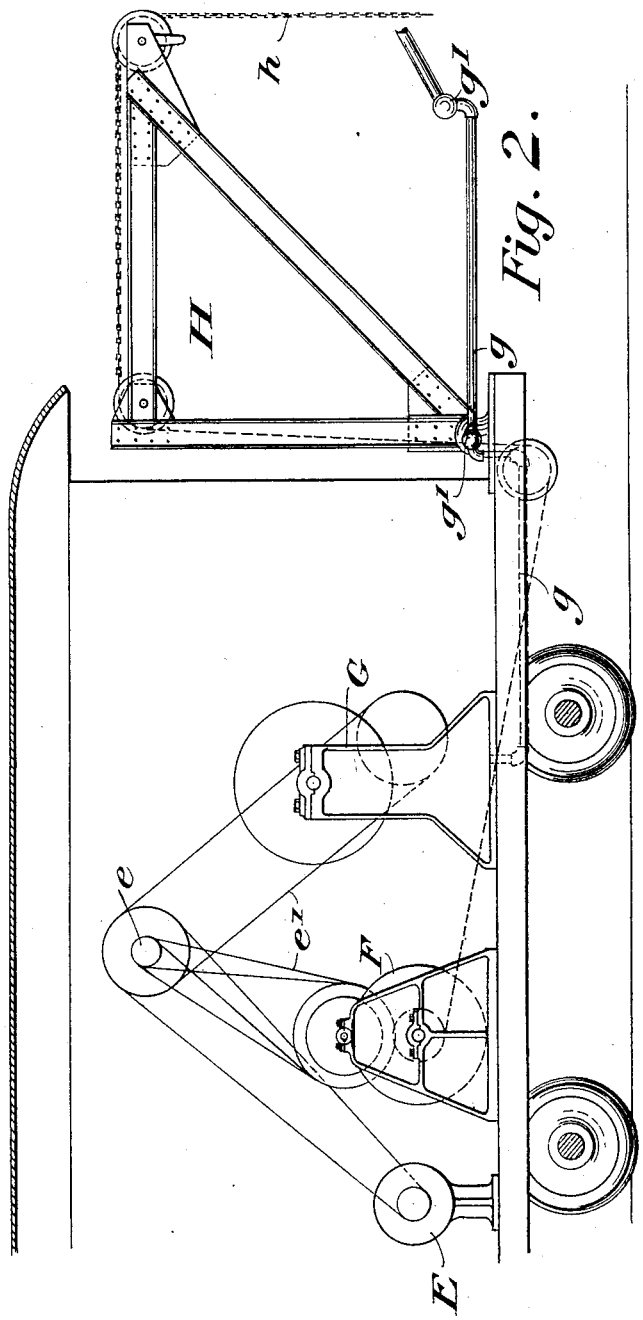
WITNESSES:
INVENTOR
Richard Eyre (No Model.) 3 Sheets—Sheet 2.

R. EYRE.
TRACK WELDING.

No. 602,284. Patented Apr. 12, 1898.

WITNESSES
H. C. Tiff.
Myrtle E. Sharpe.

INVENTOR
Richard Eyre

UNITED STATES PATENT OFFICE.

RICHARD EYRE, OF JOHNSTOWN, PENNSYLVANIA, ASSIGNOR TO THE JOHNSON COMPANY, OF LORAIN, OHIO.

TRACK-WELDING.

SPECIFICATION forming part of Letters Patent No. 602,284, dated April 12, 1898.

Application filed September 22, 1897. Serial No. 652,523. (No model.)

*To all whom it may concern:*

Be it known that I, RICHARD EYRE, of Johnstown, Cambria county, Pennsylvania, have invented certain new and useful Improvements in Track-Welding, of which the following is a specification.

My invention relates to electric welding, and especially to the joining of rails by means of portable welders which are adapted to electrically weld the rails directly together while they are laid in the track. In this way a continuous rail may be provided which will have an unbroken tread-surface, which will offer a continuous passage free from electrolytic agencies for the electric current and which will be composed of joints free from any flexibility and without a number of parts which always tend to loosen under the constant shock which is given by the passing vehicle.

Electrically-welded continuous track has hitherto been made by welding either splice-bars or chocks to the side of the rails to be joined.

The strongest possible weld for a given welded section between two rails is a direct butt-weld of rail to rail. One object of my invention is to provide means for making a direct butt-weld in the track without resorting to the use of extraneous side pieces.

In a patent issued to me on the 22d day of June, 1897, and numered 585,160, I described a certain improved method of making electric welds, which consists in highly compressing the weld and the upset metal around the weld simultaneously with its formation. One of the objects of the present invention is to utilize, as far as may be, this improved method of welding, thereby obtaining a strong and tough weld.

Another object of my invention is to provide means whereby a complicated section—such, for example, as the girder-rail shown—may be uniformly heated throughout the section without requiring that the passage of the current shall be controlled by a number of dynamos and stationary transformers.

Other objects of my invention, which are subsidiary to the main objects already set forth, will appear fully hereinafter.

The following is an outline of the method used and means employed to weld a continuous rail in accordance with my invention.

The electric current is taken from the main railway-circuit or other source of supply and transformed from a direct into an alternating current by means of a rotary transformer. From this it passes to a stationary alternating transformer, in which its volume is increased and its voltage proportionally reduced.

The rotary transformer and the stationary transformer are carried on suitable cars, the stationary transformer being arranged to raise and lower and to swing from one side of the car to the other, so that its terminals may engage either rail.

A contact is clamped to one side of the abutting rails and to the opposite side of the other of the abutting rails. The transformer-terminals engage the back of these contacts, and the current passes diagonally through the joint. Opposite each contact is placed a die of a shape somewhat similar to that of the corresponding contact, and the terminals also bear against these dies, but insulation is inserted, so that current can pass only through the contacts. Engaging the rear ends of the contacts and dies are stops rigidly secured to the rail, so that when the rails are moved toward each other, as hereinafter described, the contacts and dies will also move forward and compress the upset metal between them. Means are also provided for preventing the upsetting of the top or bottom of the rail.

To supply the necessary upset, I provide an upsetting-machine adapted to grip the rails on each side of the joint, adapted to surround the stationary transformer, and adapted to be operated by hydraulic pressure. I provide means for raising, lowering, and swinging the upsetting-tool and a high-pressure pump for supplying the hydraulic pressure therefor, the pipe system between the pump and the upsetting-tool being arranged so that it will not interfere with the free movement of the upsetter.

The above as well as the more detailed portions of my invention will be more fully set forth in the following description, due reference being had to the accompanying drawings, in which—

Figure 4:
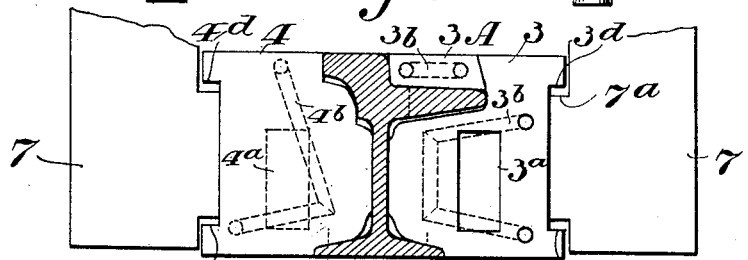
Figure 5:
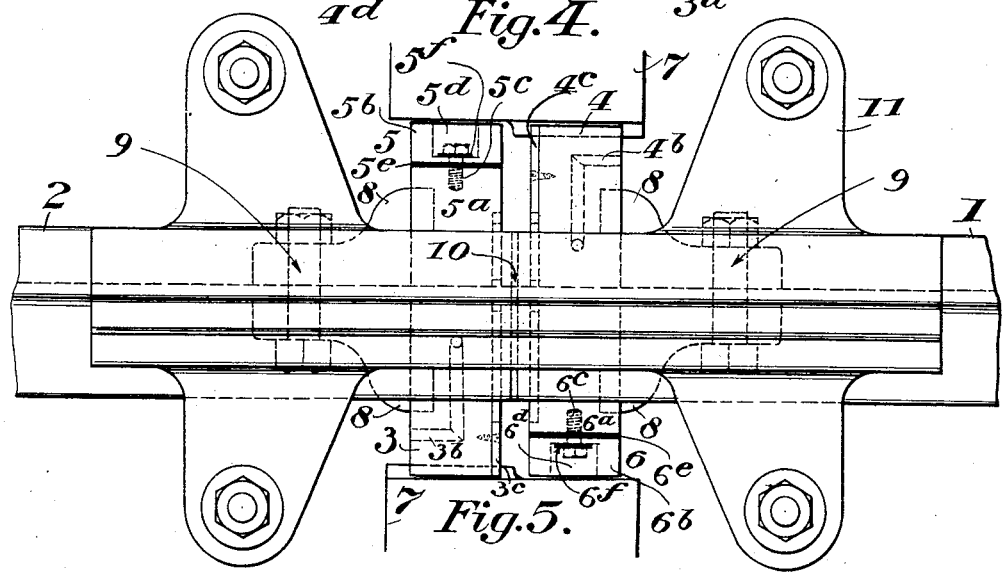
Figure 6:
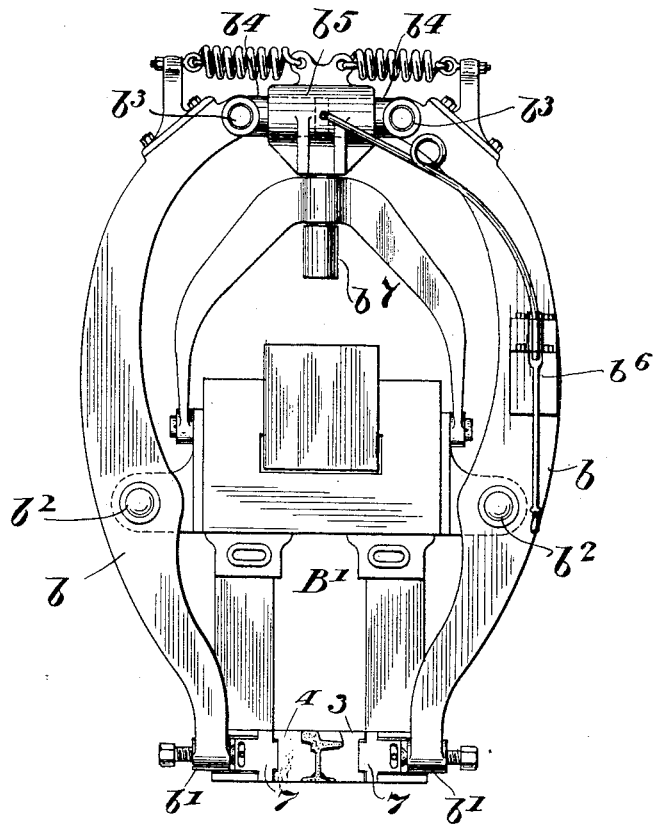

Figure 1 is a plan view of three cars carrying the rotary transformer, stationary transformer, and upsetting-tool with their respective appurtenances. Fig. 2 is a sectional view of part of the car which carries the upsetting-tool. Fig. 3 is an end view showing the rail with the various parts secured thereto ready to be engaged by the terminals of the stationary transformer. Fig. 4 is a similar view showing only the contacts. Fig. 5 is a plan view of the parts shown in Fig. 3. Fig. 6 is an elevation of the transformer B' and the apparatus upon which the transformer is carried.

A is the car containing the rotary transformer A'. B is the car which carries the stationary transformer B'. C is the car which carries the upsetting-tool D, composed of the yoke D', the cylinder $D^2$, and the plunger $D^3$. All these cars are provided with the usual propelling-motors and controlling apparatus therefor; but these I have not shown, as they form no part of my invention, nor have I shown the switchboard and controlling apparatus for the welding-circuit, which is carried in the rotary-transformer car, nor, except diagrammatically, have I shown the water-circulation system for cooling the contacts and the means for raising, lowering, and swinging the stationary transformer which are carried in car B.

E is a motor operated by the direct trolley-current, which by means of the counter-shaft $e$ and the belting $e'$ operates the drum F and the pressure-pump G.

H is a crane by which the upsetting-tool D is carried by means of the chain or cable $h$, which passes around suitable pulleys and is secured at its other end to the drum F.

The pump G is connected by means of a pipe system $g$ and the three jointed couplings $g'$ to the cylinder $D^2$ of the upsetting-tool. G may be any suitable pressure-pump adapted to supply a large volume. The one I employ supplies a pressure of about three thousand pounds to the square inch and a volume of about three hundred cubic inches per minute.

$w$ and $w'$ are wedges which bear against the web of the rail and are driven into jaws carried by the plunger and yoke, respectively.

Turning now to Figs. 3, 4, and 5, 1 and 2 are the rails to be welded. 3 and $3^A$ are the contacts for the tram side of the rail, and 4 is the contact for the head side of the rail. Contact $3^A$ is not secured to contact 3, but bears against it, as shown, the undercut edge of contact 3 preventing the contact $3^A$ from rising when lateral pressure is transmitted from the terminals 7. 5 is a steel die opposite to the contact 3, and 6 is a corresponding die opposite the contact 4. 7 7 represent the terminals of the stationary transformer. 8 are back-stops bolted to the rails at 9 and fitting in the rear ends of the contacts and dies. 10 is a shim or dutchman of a cross-section similar to the rail and fitting between the ends of the rail. 11 is a clamp resting on the top of the rail and arranged to form a bridge over the joint for the wheels of cars A and B. 12 is a base member bearing against the bottom of the rail, and 13 are bolts securing the clamp 11 and the base member 12 in place.

Referring now to Fig. 6, the stationary transformer B' is supported on the end of the boom $b^7$, which extends from the car B. Pivoted to the transformer at $b^2$ are arms $b$, whose lower ends $b'$ engage the back of the terminals 7. The upper ends of these arms are pivoted at $b^3$ to plungers $b^4$, which enter the cylinder $b^5$. $b^6$ represents a high-pressure hand-pump which is connected by suitable piping, as shown, to the center of the cylinder $b^5$, so that when the pump is in operation the water enters the cylinder, forces the plungers outwardly, and thereby moves the lower ends of the arms and the terminals 7 toward each other.

The construction of the insulated dies is as follows:

$5^a$ is a steel block fitting the contour of the rail, and $5^b$ is a block secured to $5^a$ by means of the bolts $5^c$, the head of which bears in a recess $5^d$ in the back of the block $5^b$. $5^e$ and $5^f$ are insulating members. The block 6 is formed in the same manner.

The contacts 3 and 4 bear against the side of the rails, except where under the tram and at and near any sharp corners in the contour of the rail. This is clearly shown in Fig. 4.

$3^a$ and $4^a$ are recesses in the rear end of the contacts to receive the back-stops 8.

$3^b$ and $4^b$ represent passages for the circulation of water.

$3^c$ and $4^c$ are steel plates on the front end of the copper contacts 3 and 4 and are intended to save the copper from mutilation caused by the hot metal which is pressed in between the contacts and dies, as will be hereinafter described. These plates do not bear against the rail, about a quarter of an inch clearance being allowed to prevent current from passing through the steel plates and unduly heating them.

The first step to be taken is to clean the juxtaposed ends of the rails and that portion of the sides thereof against which the contacts 3 and 4 are intended to bear. This may be accomplished by any suitable means; but to avoid the necessity of separating the rails a large enough distance to allow of the insertion of any clearing-tool I prefer to supply a sand-blast apparatus of the type used in foundries for the cleaning of castings. In practice it has been found that the rails are a sufficient distance apart to allow of the use of the sand-blast, but occasionally they will be found to closely abut, and in such cases I drive a wedge between them, or I may use a special tool for this purpose—such, for instance, as that described in the Letters Patent granted December 17, 1895, to Ward Raymond, and numbered 551,649. The next step is to prepare the joint for the welding apparatus. The distance between the center of the hole through which a bolt 9 may be passed and the end of the rail is a known quantity. The preferred distance from the inner edge of the contact to the end of the rail is a quantity that has been determined beforehand by the results of experience. With the particular section formed I have found five-eighths of an inch to be about the best distance from the inner end of the copper to the end of the rail, except in those cases in which a shim 10 is inserted. With these distances arranged for beforehand the length of the back-stops 8 may be such that when bolted in the position shown, with their ends fitting in the recesses in the contacts and dies, they locate the same at the proper positions and hold them in this position ready for the terminals 7 to engage them. The clamps 11 and 12 are then secured in position, as shown, and the joint is ready for the welding apparatus, which has in the meantime been welding other similarly cleaned and prepared joints. Car C is next placed in position and the upsetter D lowered into the position shown in Fig. 1, when the crane H may be loosened and swung into the position shown. Wedges $w$ and $w'$ are driven into place and the pump operated by a suitable belt-shifting mechanism, which I have not thought it necessary to show, until the rails have been brought into close contact with each other. While driving the wedges and bringing the rails into contact cars A and B have been brought into position and the stationary transformer B' swung inside the yoke and lowered, a small pump $b^6$, carried by the stationary transformer, being operated to press the terminals 7 against the back of the contacts and dies. The welding-circuit is now closed, and the current, stopped by the insulators $5^e$ and $5^f$ and $6^e$ and $6^f$, can only pass from one terminal 7, contact 3, rail 2, rail 1 and contact 4 to the other terminal 7, thus passing diagonally through the joint to be welded.

When current passes longitudinally through an irregular section, it heats the thicker portions of the section more than the thinner portions. There are two reasons for this. In the first place, while the resistance of the metal is directly proportional to the section the thin section has relatively a much greater surface from which to radiate heat. In the second place, an alternating current tends to travel to a larger extent through the central portions of the metal than it does through the outer portions thereof. On the other hand, if the current passes transversely through an irregular section the thinner portions tend to heat more quickly than the thicker portions, because the distance to be traversed is less. When the current passes diagonally through the joint, however, the two opposing effects are to a large extent neutralized. The closer the contacts are placed to the end of the rails the nearer is the heat effect to that of a plain transverse passage across the rail, and vice versa. It is largely for this reason that I have provided the diagonally-arranged contacts, for it is evident that it is impracticable with a portable system to supply a plurality of dynamos and transformers with independently-controlled terminals, as is usual in shop practice when welding complex sections. By passing the current diagonally through the joint I am enabled to equalize the heating effect sufficiently that with the aid of the controlling means, which I will describe, the section may be heated with perfect uniformity. Besides this advantage of the diagonal arrangement it is clear that any other practicable means for passing the current through the joint suitable for butt-welding would require that each transformer-terminal would bear against each side of each rail, and this would complicate the apparatus exceedingly.

On that side of each terminal which is to bear against a contact is formed the projection $7^a$, which bears against the contact between lugs $3^d$ or $4^d$. It is by this means that I am able to sufficiently control the passage of the current. If the terminals 7 are pressed tightly against the back of the contacts in the position shown in Fig. 4, there will be a path for the current through the web of the rail, across the head, and to a slighter extent through the lower flange. If now the head is heating too quickly, the boom $b^7$, carrying the stationary transformer, is lowered, so that the terminals 7 engage the lower of the lugs $3^d$ and $4^d$. This will throw a portion of the weight (several tons) of the transformer upon these lugs, and a better contact will be made with the flanges of the rail, so that an easy path for the current will be made through these flanges. Without describing this in detail, it is only necessary to point out that by raising or lowering the transformer the contacts may be pressed downward or upward, or neither, and that by increasing or reducing the side pressure in conjunction with this raising or lowering of the transformer the passage of the current and its consequent heating effects may be controlled at will by a skilful operator. As soon as the rail ends have reached the proper temperature the pump G is started and the plunger $D^3$ is pushed toward the joint, carrying with it the rail to which it is wedged, upsetting the heated metal, and strongly compressing it between the contacts and dies. A heavy pressure must be supplied for this purpose, because it is extremely desirable to strongly compress the metal between the contacts and dies, thus strengthening and toughening its character. In addition to the pressure required for compression a decided amount is required to move the rails through the ground to allow of the necessary upset.

In Fig. 5 I have shown a dutchman 10 between the rails. It is clear that in the welding of a continuous rail, unless some special means are provided, the upset will have a cumulative tendency, so that before long it will become impracticable to pull the rail through the ground sufficiently to close the gap between it and its neighbor. One means of avoiding this trouble is to weld between the rails a dutchman 10 of the same thickness as the upset to be given. Another means would be to allow the gap to become cumulative until it reached a fixed maximum, when a short section of rail may be inserted and a double weld made. Or a compromise of both methods may be used—that is, a shim may be welded in at each joint, but an upset given somewhat larger than the shim, the latter only decreasing the celerity of the cumulative growth of the gap. As soon as the weld is upset and compressed the plunger is pushed back, the wedges removed, the transformer lifted and swung over, and the cars removed to the next joint. After removing the clamps and dies a straight-edge is applied to the head and gage-line of the rail, and, if necessary, a file or special tool is employed to form a perfect running surface. The joint is now ready for travel.

I am enabled by my invention to provide a continuous track composed of welds of the strongest possible character, forming the best possible circuit for the electric current and having a tread-surface at the joint which is in all respects as smooth and as rigid as that of the balance of the rail. In actual practice there is so large a factor of safety in the strength of these welds that for purposes of economy I prefer to cut off a portion of the flange and tram sections of the rail at its end, as indicated by dotted lines in Fig. 4.

I do not desire to be limited to the use of my invention upon any particular form of rail-section, nor to the use of the particular details which have been described for the purpose of fully disclosing how my invention may be put into practical service. Many modifications of the particular apparatus described will readily suggest themselves to any one skilled in the art.

I have described my invention with special reference to the welding of a continuous rail; but it is readily adapted for other specific uses, and it is not my intention to limit it to this specific use.

Having thus described my invention, what I claim, and desire to protect by Letters Patent, is—

1. The combination with the terminals spanning the ends of the rails, of dies and contacts, detached from said terminals, and secured directly to the sides of said rails, and an upsetting-tool surrounding said terminals and secured to both rails.

2. The herein-described method of welding rails together while permanently laid in the track which consists in passing the current from a suitable source of supply diagonally through the juxtaposed rail ends and then moving the rails longitudinally through the road-bed to upset and compress the heated metal.

3. In electric welding apparatus a contact bearing against one side of one of the articles to be welded, and a second contact bearing against the other side of the other of said articles.

4. The combination of a pair of detached contacts secured to the sides of the rails, a pair of terminals adapted to contact with said contacts, a yoke passing around said terminals and at one end engaging one rail, and a movable plunger at the other end of said yoke engaging the other rail.

5. The combination with the terminals of the transformer, of a pair of contacts engaged thereby and bearing against the articles to be welded at positions diagonally disposed with relation to the joint, and insulated dies bearing against each of the articles and opposite to the contacts, and means for moving the said articles and the contacts and dies toward each other.

6. The combination of a pair of contacts bearing against the side of the rails and diagonally disposed relatively to the ends thereof, a pair of dies having insulating members occupying positions opposite to those of the contacts, and the transformer-terminals bearing against the backs of the contacts and dies.

7. A tool for moving rails longitudinally through the track and toward each other comprising a yoke surrounding the ends of the rails, jaws at one end of the yoke for engaging one of the said rails, a cylinder bearing against the other end of the yoke and a plunger extending from said cylinder and having jaws for engaging the other of the said rails.

8. A contact adapted to bear against one side of the rail and a die adapted to bear against the opposite side thereof, in combination with a pair of back-stops entering recesses in their rear ends and bolted together through a hole in the rail.

9. The combination of the diagonally-disposed contacts 3 and 4, the diagonally-disposed insulated dies 5 and 6, the back-stops 8 secured to the rails to be welded and engaging the rear ends of the contacts and the dies, the top and bottom clamps 11 and 12, and the members 13 connecting the same and forcing them into contact with the top and bottom of the rails.

10. The combination with means for heating and upsetting the ends of the rails, of contacts and dies bearing against the sides of the rails near the ends thereof, and members secured together and bearing respectively against the top and bottom of the rails at the ends thereof.

11. The combination with a stationary transformer having terminals spanning the rails to be welded, of contacts bearing against the side of the rails, and means, controlled by the movement of the terminals, for adjusting the position, and relative pressure of the contacts against different portions of the rail.

12. In a welding apparatus the combination of a pair of contacts each bearing against a side of one of the articles to be welded and a pair of vertically and transversely movable transformer-terminals bearing against the back of the contacts, and controlling the path of the current through the said articles by their relative vertical and transverse positions, in relation to the contacts.

13. The combination of the contacts 3 and 4 having the lugs $3^d$ and $4^d$, with the transformer-terminals 7 having the projections $7^a$ extending between said lugs.

14. The combination of a car, a crane carried thereby and in turn carrying a tool for moving rails longitudinally through the track, a source of motive power upon the car, connections therefrom to a power-pump, a pipe system from the pump to the cylinder of the said tool, and swinging joints in said pipe system for allowing freedom of movement to the tool.

In testimony whereof I have affixed my signature in presence of two witnesses.

RICHARD EYRE.

Witnesses:
MYRTLE E. SHARPE,
H. W. SMITH.